United States Patent
Brown et al.

(10) Patent No.: US 6,846,176 B2
(45) Date of Patent: Jan. 25, 2005

(54) METHOD AND APPARATUS FOR HEATING A ZONE OF AN ELONGATE TUBULAR ARTICLE

(75) Inventors: Robert J. Brown, Abu-Dhabi (AE); Thomas H. Bechtold, Rheinberg (DE)

(73) Assignee: Shawcor Ltd., Ontario (CA)

( * ) Notice: Subject to any disclaimer, the term of this patent is extended or adjusted under 35 U.S.C. 154(b) by 324 days.

(21) Appl. No.: 10/017,238

(22) Filed: Dec. 14, 2001

(65) Prior Publication Data

US 2002/0098457 A1 Jul. 25, 2002

(30) Foreign Application Priority Data

Dec. 15, 2000 (CA) .............................................. 2328689

(51) Int. Cl.$^7$ ................................................ F24J 3/00
(52) U.S. Cl. ........................ 432/226; 432/10; 138/110
(58) Field of Search ............................ 432/10, 65, 209, 432/226, 225; 285/45, 53; 138/155, 110

(56) References Cited

U.S. PATENT DOCUMENTS

| 2,108,077 | A | | 2/1938 | Robinson |
| 3,051,509 | A | | 8/1962 | Wilton et al. |
| 3,772,113 | A | * | 11/1973 | Patrick ........................ 156/94 |
| 4,428,789 | A | | 1/1984 | Masaaki et al. |
| 4,961,805 | A | * | 10/1990 | Siebert ....................... 156/251 |
| 5,482,087 | A | * | 1/1996 | Overbergh et al. .......... 138/110 |
| 5,655,699 | A | | 8/1997 | McGushion |
| 5,662,974 | A | * | 9/1997 | Andrenacci et al. ....... 428/36.9 |
| 5,980,191 | A | | 11/1999 | Trible |
| 6,020,023 | A | * | 2/2000 | Keller et al. ................ 427/140 |
| 6,402,201 | B1 | * | 6/2002 | Pool et al. .................... 285/47 |

FOREIGN PATENT DOCUMENTS

| GB | 829179 | 2/1960 |
| GB | 983413 | 2/1965 |
| GB | 2 262 146 A | 9/1993 |
| JP | 60122133 | 6/1985 |
| WO | WO 01/34340 A1 | 5/2001 |
| WO | WO 01/87584 A1 | 11/2001 |
| WO | WO 01/91966 A1 | 12/2001 |

* cited by examiner

Primary Examiner—Gregory Wilson
(74) Attorney, Agent, or Firm—DeLio & Peterson, LLC; Peter W. Peterson

(57) ABSTRACT

A method for heating a zone of an elongate tubular article. A heat resistant, heat transmitting and heat dispersive shroud material is applied to the zone and a hot gas source is applied to the outside of the shroud material to cause heat to be transmitted through the shroud material to the zone.

16 Claims, 4 Drawing Sheets

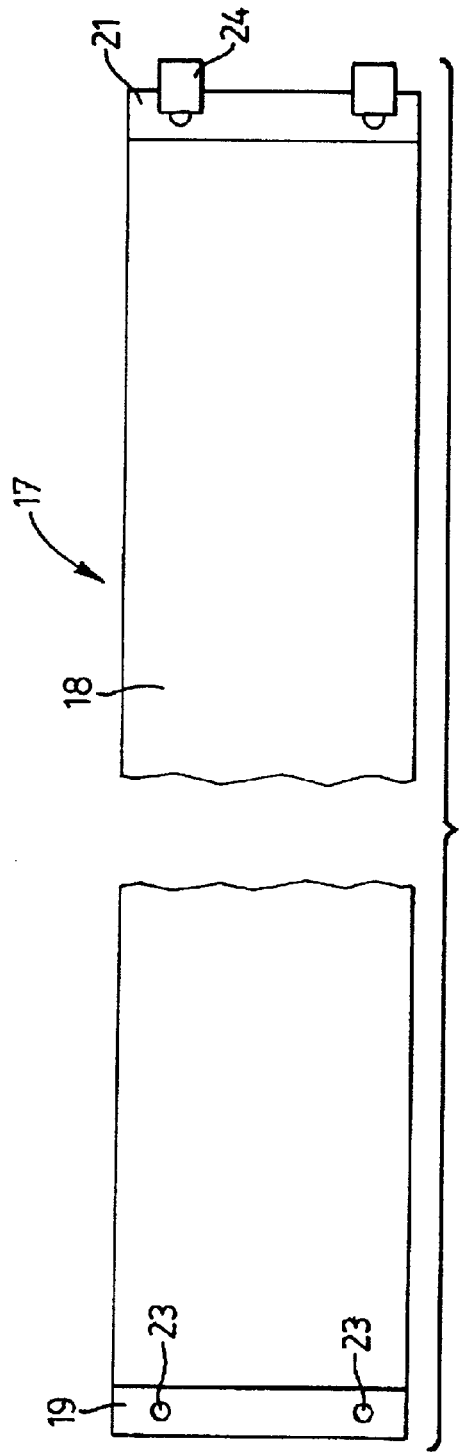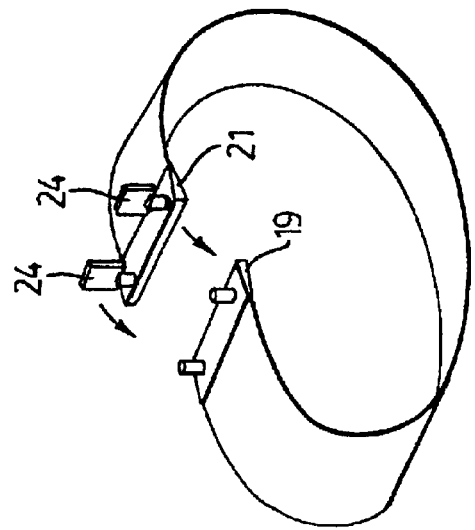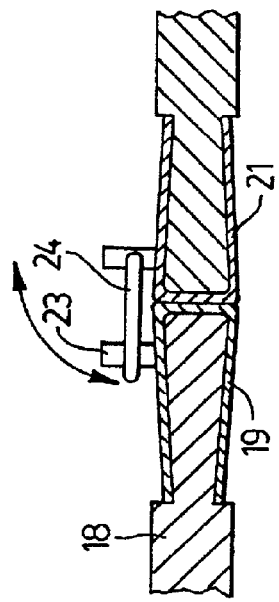

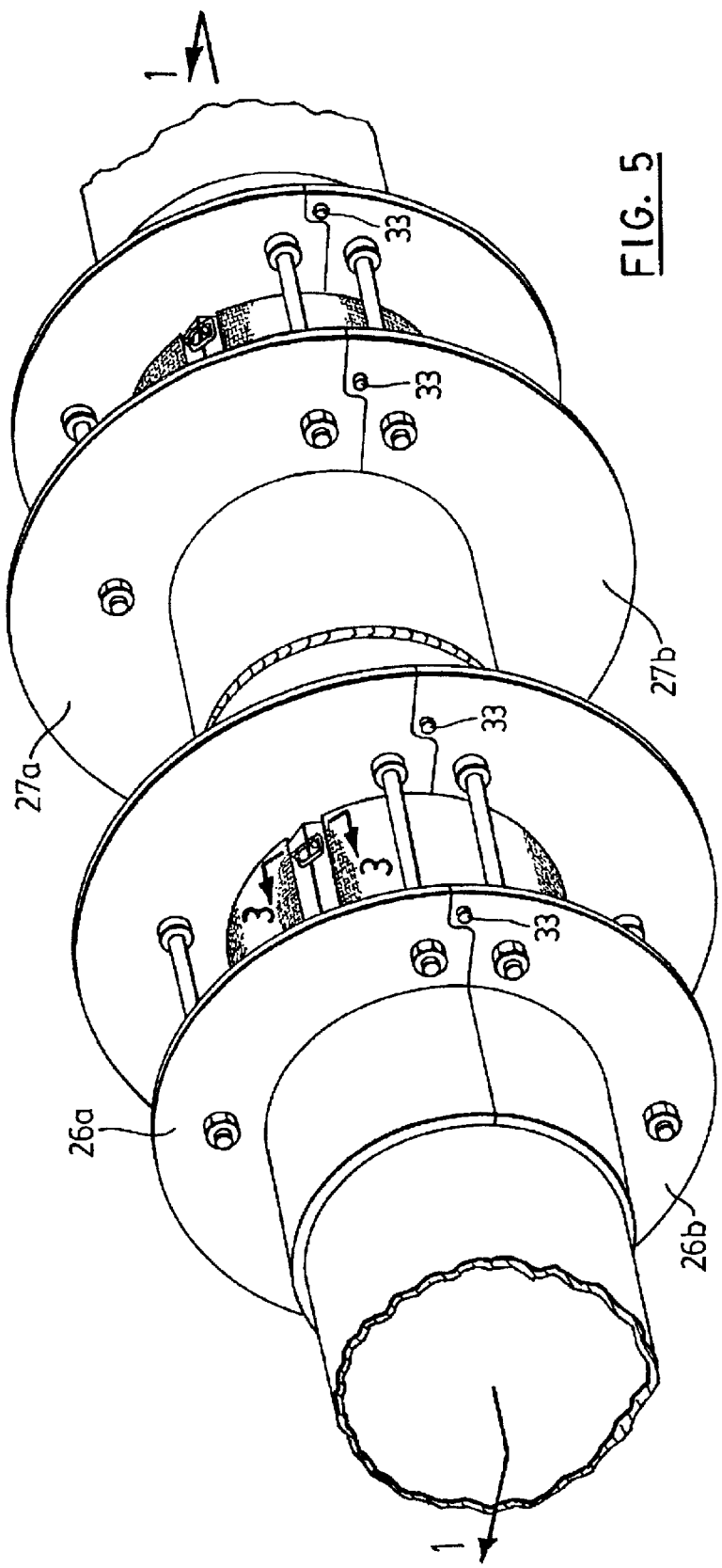

METHOD AND APPARATUS FOR HEATING A ZONE OF AN ELONGATE TUBULAR ARTICLE

BACKGROUND OF THE INVENTION

The present invention relates to a method and apparatus for heating a zone of an elongate tubular article, for example a zone of the surface of a pipeline in the course of applying a sleeve or patch on coated pipes, employing a hot gas source, such as a heater device that provides a heated air stream, or when using a flame, such as a torch flame to heat the pipe.

Heating may, for example, be employed for heating a pipeline weld joint and the adjacent coating in the field to a temperature suitable for subsequent installation of a covering. In particular, the present method and apparatus are especially useful where the temperature to which the line coating must be heated exceeds its melting point, and the covering is to be applied is a heat shrinkable sleeve, tape or patch coated with a hot melt adhesive whose adhesive requires the substrate to be heated to a temperature close to or above the melting point of the substrate. More particularly, the method is especially advantageous when the coating on the pipeline is polypropylene, and the hot melt adhesive on the sleeve, tape or patch requires the substrate to be at least 160° C. in order to achieve an acceptable bond.

BRIEF SUMMARY OF THE INVENTION

In the present invention, a heat resistant, heat transmitting and heat dispersive shroud material is applied on a zone of the surface of the pipeline or other elongate tubular article to be heated, and a hot gas source is applied to the outside of the shroud material to cause heat to be transmitted through the shroud material to said zone.

The function of the shroud material is to protect the pipeline coating from direct exposure to the combustion product of the flame, while effectively transferring the heat from the flame to the pipeline coating. In the absence of the shroud material, the extreme temperature of the flame or hot gas has been found to degrade the pipeline coating. For example, if the pipeline coating is polypropylene, it causes the surface to become "waxy" due to degradation of the polymer and/or blooming to the surface of lower molecular weight polymer and additives. Such a surface is very difficult to bond to.

Further, the shroud material serves to reduce the rate of heat transfer through the pipeline coating to the steel pipe, as compared with the rate of heat transfer that would occur if the hot gas source were played directly on the pipeline coating. Such reduction in the rate of heat transfer may for example be achieved by virtue of the fact that the shroud material may be heat insulative, so that a temperature gradient exists between the outer and the inner sides of the shroud material. Secondly, or alternatively, the shroud material may be heat dispersive, that is to say it disperses hot gases transversely over its outer side when a source of hot gas is played on the outer side of the shroud material.

By reducing the rate of heat transfer through the pipeline coating, the advantage may be achieved that, with adhesively bonded thermoplastic coatings, the reduction in heat transfer may reduce or eliminate total melting of the coating and adhesive and consequent dimensional instability of the coating and/or adhesive.

While the method of the present invention is particularly advantageous when used in the installation of field coating over pipelines covered with thermoplastic coatings, it may be used advantageously for pipes coated with any material which does not stand up well upon direct exposure to a flame, and with any field-applied coating system which requires substrate temperatures high enough to imperil the integrity of the pipe coating.

The shroud material should be heat resistant, so that it does not melt, burn, distort or decompose when the hot gases or flame is played on it.

The shroud material is preferably designed to transmit heat at an optimum rate to the pipeline coating. If it is too insulating, the heating rate will be unacceptably low. If it is too conductive, or if it has openings that allow the hot gases to pass through, it will not protect the pipeline coating against degradation. Examples of suitable materials include non-burning, continuous pervious woven or non-woven blanket materials, for example non-metallic woven blanket materials, metallic mesh materials, and heat conductive sheet materials for example metal strip material which may, for example, be backed with an insulative liner, which may also serve as a release coating, for example of polytetrafluoroethylene (TEFLON trade-mark). One skilled in the art of pipeline coatings can readily determine by routine experimentation whether a given material is suitable for use as a shroud material in accordance with the invention.

Desirably, the shroud material is flexible, so that it can be wrapped around or will conform closely to the curvature of the pipeline or other tubular article. One particularly preferred material is woven glass fibre mat, for example two thicknesses of the woven glass fibre material sold by Amatek Inc., Wilmington, Del., under the trade-mark SILTEMP P4CSR.

In one particularly preferred form of the present invention, the shroud material is used together with heat shield structures comprising two heat resistant flanges spaced apart, for example axially of the tubular article, and having the covering material disposed between the flanges, so that the heat is trapped and is more efficiently channelled to the exposed surface of the shroud material.

In the preferred form, for heating a pipeline weld joint and the adjacent coating for subsequent installation of a covering, two heat shield structures are used. At each end of the weld joint, shroud material is wrapped, the shroud material being wider than the width of the region of the pipeline coating to be heated. A heat shield structure providing an inner and an outer flange is installed over the pipeline coating adjoining the uncoated steel weld joint at each end of the weld joint. Heating, preferably by direct flame, is than trained on the region between the two inner most flanges to heat the uncoated steel to the temperature necessary to achieve a good bond to the adhesive on the field joint covering. Heating is then applied, preferably using direct flame, to the regions between the inner and outer flanges, to heat the pipeline coating to a temperature above the minimum at which a bond can be established with the adhesive on the field joint covering. The flame is trained on the non-burning shroud material and the heat penetrates through it to the underlying coating.

The heat shields are then removed, and the field joint covering is installed before the weld joint and the adjacent coating can cool to a temperature below which a bond to the field joint covering can be achieved.

In the preferred form, each heat shield structure consists of an inner split metal flange and an outer split metal flange that are connected together to create a confined space somewhat wider than the width of the portion of the pipeline coating to be heated. The outer flange preferably has a cylindrical axially outward extension to protect the pipeline coating, to assist in securing the shroud material, and to assist in achieving and maintaining alignment with the pipe.

BRIEF DESCRIPTION OF THE SEVERAL VIEWS OF THE DRAWINGS

The invention will now be described in more detail, by way of example only, with reference to the accompanying drawings.

FIG. 2 is a fragmentary plan view of a shroud material employed in the method and apparatus of the present invention.

FIG. 3 is a longitudinal cross section through the joined ends of the shroud material of FIG. 2, taken on the line 3—3 in FIG. 5.

FIG. 4 is a partially schematic perspective view showing a method of joining the ends of the shroud material.

FIG. 5 is a partially schematic perspective view showing the pipe joint together with an apparatus of the invention.

DETAILED DESCRIPTION OF THE INVENTION

Figure 1:
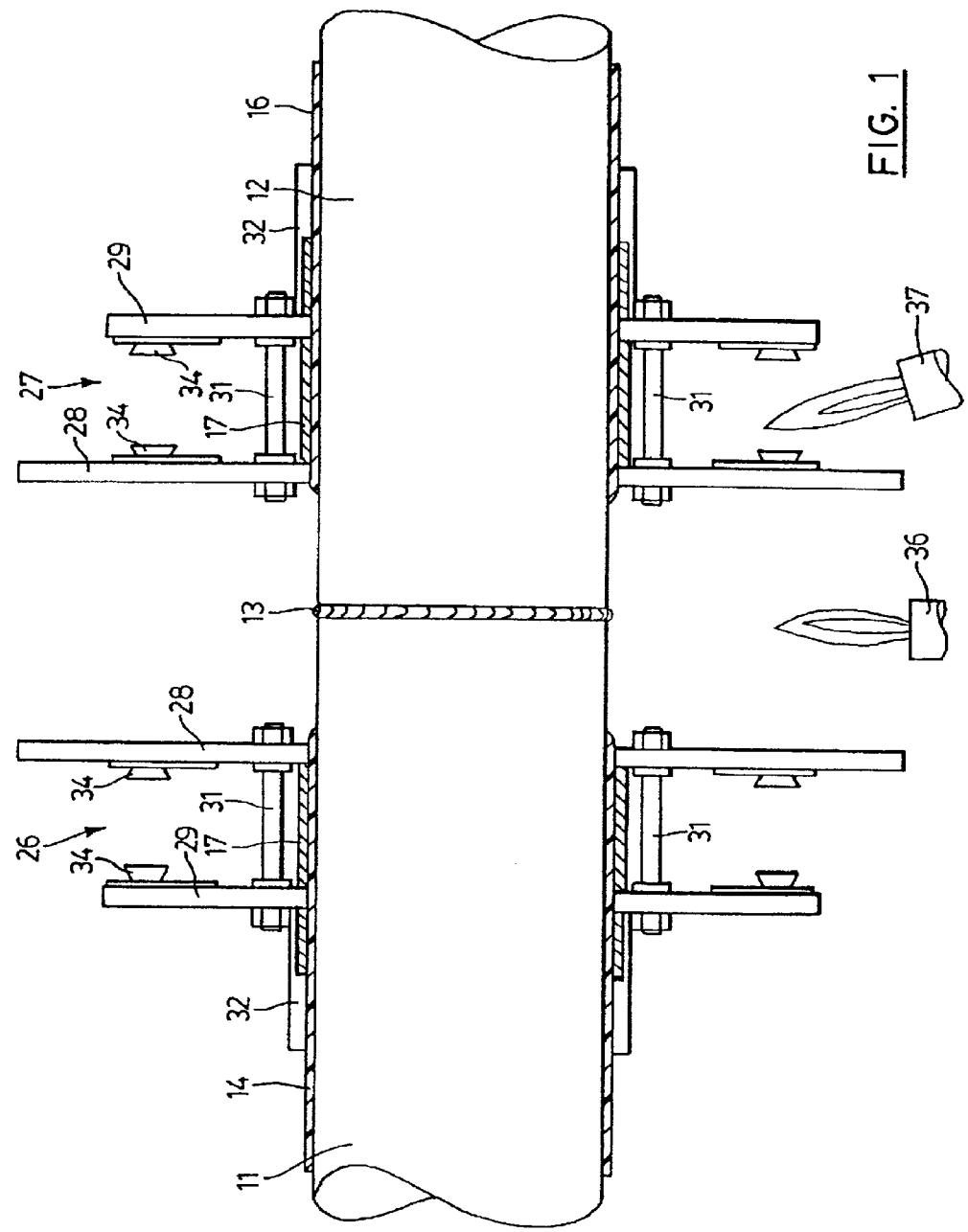
FIG. 1 is a partially schematic side view, partially in section, showing a pipe joint together with one form of apparatus in accordance with the invention.

Referring to the drawings, FIG. 1 shows by way of example pipe sections 11 and 12 welded together at a weld joint 13.

Outwardly from the joint 13, each pipe section 11 and 12 has a polyolefin, for example polypropylene, pipe coating 14 and 16 thereon.

It may be desired to install a heat shrinkable sleeve covering the portions of metal of the pipe sections 11 and 12 adjacent the weld joint 13 that are free of the coatings 14 and 16, such sleeve being connected to the coatings 14 and 16. Such heat shrinkable sleeve may be, for example, as described and shown in applicant's co-pending patent application Ser. No. PCT/CA01/00710 published under no. WO 01/87584 filed May 18, 2001, the disclosures of which are incorporated herein by reference. Such sleeve may comprise heat activatable components that require that the metal of the pipe adjacent the weld joint 13 and the coatings 14 and 16 be raised to a range of activation temperatures in order to allow successful installation.

In one preferred embodiment shown in the drawings, the ends of the coatings 14 and 16, adjacent the weld joint, have a shroud material 17 wrapped around their periphery. The wrapping of the shroud material 17 corresponds in position to and is slightly wider than the width of the regions of the pipeline coatings 14 and 16 onto which the ends of the above-mentioned heat shrink sleeve are to be shrunk.

As seen in FIG. 2, each shroud material piece 17 comprises a flexible generally rectangular band 18 provided with end fittings 19 and 21 which cooperate to allow the ends of the bands to be joined together.

In the most preferred form, each band 18 comprises two thicknesses of SILTEMP P4CSR woven glass fibre mat.

Each end fitting 19 and 21 comprises a length of metal channel, for example an aluminum extrusion, into which an end of the mat 18 is introduced, and the edges of the channel deformed inwardly from its original configuration in order to secure the mat 18. One channel 19 may be provided with a pair of upstanding lugs, while the other channel 21 is provided with lugs having pivoting clips 24. The length of the shroud material 17 is such that it fits snugly around the perimeter of the coating 14 or 16 when the ends are joined together. As seen in FIGS. 3 and 4, the joined together end 19 and 21 can be connected by flipping the clips 24 to engage over the lugs 23.

After the lengths of shroud material have been wrapped around the coatings 14 and 16, and the end fittings have been connected together, a pair of heat shield structures 26 and 27 are applied over the shroud material, as seen in FIG. 1.

Each shroud structure 26 and 27 comprises in the preferred form a pair of flanges, namely, an axially inner and axially outer radially extending annular flange 28 and 29, respectively. The flanges 28 and 29 are spaced apart by spacer rods 31 a distance corresponding to the length of the coating 14 or 16 that it is desired to heat.

Preferably, each axially outer flange 29 has connected to it an outwardly extending cylindrical extension 32.

In the preferred form, each heat shield structure, as best seen in FIG. 5 comprises two semi-cylindrical portions 26a and 26b and 27a and 27b, these portions being hinged together at hinges 33 on one side, and, on an opposite side, being provided with latches 34 that allow the portions to be latched together in a closed position.

The heat shield structure may be of any heat resistant material for example metal such as steel.

In the preferred form, as seen in FIG. 1, the opening of the inner flange 28 engages on the outer side of the coating 14 or 16, while the inner opening of the outer flange 29 and the inner periphery of the extension 32 clamps tightly on the shroud material 17 in the closed position.

In the course of installation of a sleeve, the steel pipe between the two inner flanges is heated by application of hot gases, preferably from a propane hand torch 36 until a desired temperature is attained. Other heating devices may of course be employed, for example heating devices providing a stream of hot air.

Similarly, the pipeline coatings 14 and 16 in the zone between each pair of flanges 28 and 29 is heated, again preferably with propane torches 37 until the pipeline coating attains a desired temperature.

The flange assemblies are then opened and the shroud materials 17 removed and immediately thereafter a heat shrink sleeve is applied over the heated portion and is shrunk tightly around the joint, again preferably by using heat applied directly on the exterior of the sleeve, for example with propane torches.

During the heating steps, the temperatures of the bare metal and of the coating can be measured using conventional temperature measuring devices, for example thermocouples applied to the surfaces of the metal and to the coatings 14 and 16, respectively.

An example of a procedure using the above apparatus and method described in detail with reference to FIGS. 1 to 5 will now be given.

EXAMPLE

A pipeline had a coating of 2.5 mm thick 3-layer polypropylene, and the bare steel weld joint was 100 mm wide. The procedure was as follows:

The coating adjacent to both ends of a bare steel weld joint was tightly wrapped with a double wrap of 100 mm wide Siltemp P4CSR.

A heat shield structure as shown in FIGS. 1 to 5 of the accompanying drawings was clamped over each Siltemp blanket.

The steel pipe between the two inner flanges was heated with propane hand held torches to approximately 200° C.

The propane hand torches were then directed between the inner and outer flanges on either end, directing the flame directly at the blanket, until the pipeline coating temperature reached 150 to 1600° C.

The heat shield structures and blankets were removed and immediately thereafter a heat shrink sleeve consisting of a crosslinked polypropylene-based heat shrinkable backing coated inside with a polypropylene based hot melt adhesive was placed over the heated area.

The heat shrink sleeve was shrunk tightly around the joint using the propane torches.

Upon removal of the blanket after heating, it was apparent that the surface of the polypropylene was not waxy.

After completion of the procedure and cooling to ambient temperature, excellent adhesion was observed between the sleeve adhesive and the pipeline coating, and between the sleeve adhesive and the steel.

While the above description has referred to application of a sleeve to the exterior of a pipeline coating, it will be appreciated that a similar blanket structure and heat shield structure may be used in the application of a patch to effect a repair to a holiday in a pipeline coating.

Figure 6:
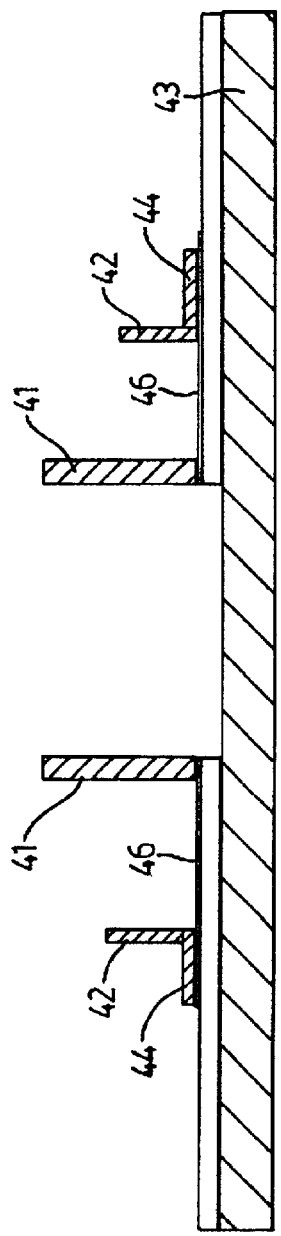
FIG. 6 is a partially schematic cross section showing a further form of apparatus in accordance with the invention.
Figure 7:
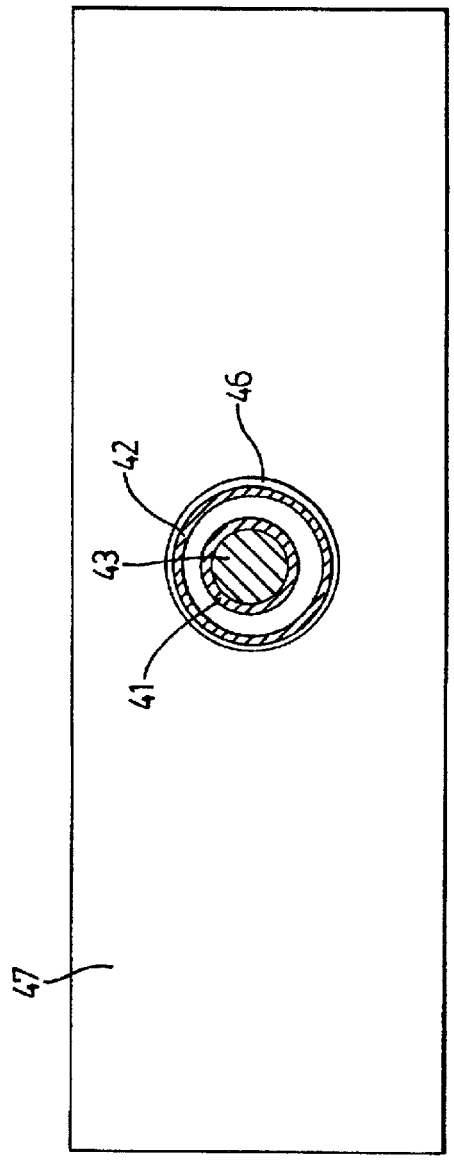
FIG. 7 is a plan view of the apparatus of FIG. 6.

For example FIGS. 6 and 7 show a heat shield structure comprising inner and outer endless, for example cylindrical, heat resistant flanges 41 and 42, respectively, extending away from and preferably substantially normal to the surface of the pipe 43. Outer cylinder 42 has a transversely outward extension 44. The radially inner surfaces of elements 41, 42 and 44 may be saddle-shaped to conform to the curvature of pipe 43. Shroud material 46 extends between flanges 41 and 42 and preferably beneath extension 44. The heat shield structure and shroud material may be formed from materials similar to those employed for the corresponding elements in the apparatus described above with reference to FIGS. 1 to 5. In use, an appropriately sized circle of damaged coating 47 is removed down to bare metal 43. The heat shield structure and shroud material is applied as shown in FIGS. 6 and 7. The bare metal 43 is heated through the inner cylindrical shield 41 and the adjacent coating 47 by training a flame into the annular section between cylinders 41 and 42. Once the desired temperatures are attained, the heat shield and shroud material are removed and a patch of heat activatable repair material is applied.

What is claimed is:

1. Method for heating a zone on a substrate of an elongate tubular article, the zone comprising a coating on a substrate, the method comprising:
    applying a heat transmitting and heat dispersive shroud material to the zone, adjacent a second zone bare of said coating,
    applying a heat shield structure adjacent the shroud material, said heat shield structure comprising a first heat-resistant flange extending away from a surface of the article adjacent said second zone and a second heat-resistant flange extending away from the surface adjacent the coating, said shroud material being disposed between said first and second flanges, and
    applying a hot gas source to the outside of the shroud material to cause heat to be transmitted through the shroud material to heat the coating, wherein said shroud is resistant to melting, distortion or degradation when said hot gas is applied to it.

2. Method as claimed in claim 1 including the step of heating said second zone by application of hot gas to said second zone.

3. Method of installing a heat-activatable repair patch over a portion of a tubular article having a coating extending at least over a first zone thereof and having a second zone bare of said coating, comprising heating said first and second zones to activation temperatures appropriate for the patch employing a heating method as claimed in claim 2 and thereafter installing said patch.

4. Method of installing a heat activatable sleeve over a weld joint area of a coated pipeline having first zones including said coating axially outwardly from a second is zone bare of said coating, comprising heating said first and second zones to activation temperatures appropriate for said sleeve employing a heating method as claimed in claim 2, and thereafter installing said sleeve.

5. Method as claimed in claim 4 wherein at least one heat shield structure has said first and second flanges axially spaced and said shroud material is wrapped around the girth of the pipeline.

6. Method as claimed in claim 1 wherein said second flange has a transversely outward extension.

7. Method for heating a first zone of an elongate tubular article comprising a substrate and a heat-degradable coating on said first zone, said first zone extending adjacent a second zone comprising said substrate bare of said coating, the method comprising the steps of applying to said first zone a heat transmitting and heat dispersive shroud material, said shroud material not extending over said second zone, and applying a hot gas source to a side of said shroud material away from the first zone to cause heat to be transmitted through the shroud material to said heat-degradable coating wherein said shroud material is resistant to melting, distortion or degradation when said hot gas source is applied to it, and whereby said coating can be raised to an elevated temperature without suffering a heat degradation.

8. Method as claimed in claim 7 wherein said shroud material is flexible.

9. Method as claimed in claim 7 wherein said shroud material comprises pervious blanket material, metallic mesh material or heat conductive sheet material.

10. Method as claimed in claim 7 wherein the hot gas source is a torch flame.

11. Method as claimed in claim 7 herein said zone comprises a coating on a substrate and said coating is heated through said shroud material.

12. Method as claimed in claim 11 wherein said shroud material is applied on a zone adjacent a second zone bare of said coating.

13. Apparatus for use in applying heating to an elongate tubular article comprising heat shield structure having first and second spaced heat resistant flanges adapted to extend outwardly from the article and in association with each heat shield structure a heat transmitting and heat dispersive shroud material adapted to extend over said article between said first and second flanges, said shroud being resistant to melting, distortion or degradation when hot gas is applied to it.

14. Apparatus as claimed in claim 13 for use in preheating a portion of said article for reception of a patch, wherein said first and second flanges are endless, and said second flange is spaced transversely outwardly from said first flange.

15. Apparatus as claimed in claim 13 for use in preheating a weld joint area for reception of a sleeve, wherein said flanges are adapted to extend radially from the article, and said shroud material is adapted to extend around the girth of the article.

16. Method for heating a zone of an elongate tubular article comprising applying to the zone a heat transmitting and heat dispersive shroud material comprising woven glass fibre blanket, and applying a hot gas source to the outside of the shroud material to cause heat to be transmitted through the shroud material to said zone, wherein said shroud is resistant to melting, distortion or degradation when said hot gas is applied to it.

* * * * *

UNITED STATES PATENT AND TRADEMARK OFFICE
CERTIFICATE OF CORRECTION

PATENT NO. : 6,846,176 B2
DATED : January 25, 2005
INVENTOR(S) : Brown et al.

It is certified that error appears in the above-identified patent and that said Letters Patent is hereby corrected as shown below:

Column 6,
Line 36, delete "herein" and substitute therefore -- wherein --.

Signed and Sealed this

Twenty-fourth Day of May, 2005

JON W. DUDAS
*Director of the United States Patent and Trademark Office*